Feb. 3, 1959
J. R. OISHEI ET AL
2,871,498
WINDSHIELD WIPER
Filed Jan. 31, 1955
2 Sheets-Sheet 1
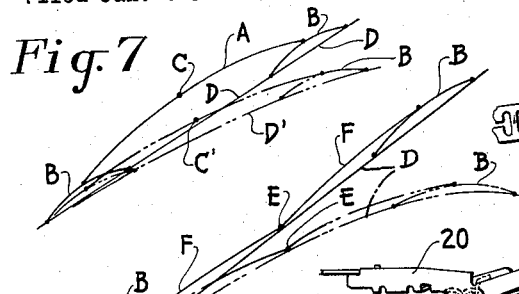
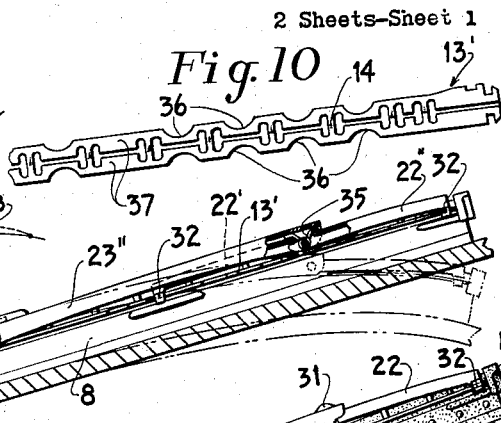
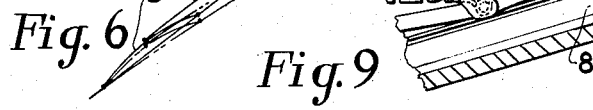
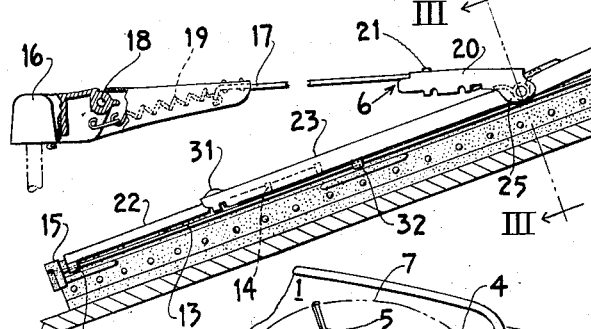
INVENTOR.
John R. Oishei and
BY Erwin C. Horton
Bean, Brooks, Buckley & Bean
ATTORNEYS

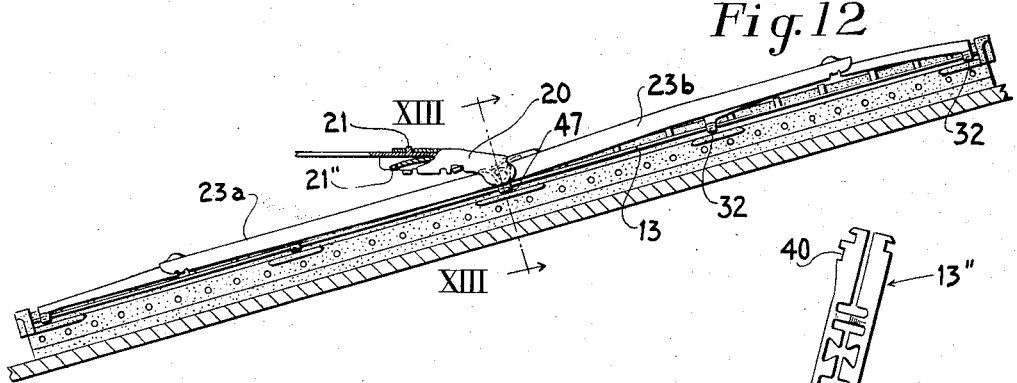
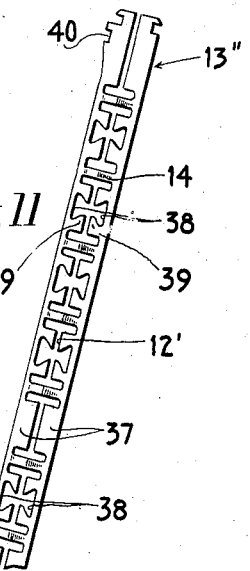
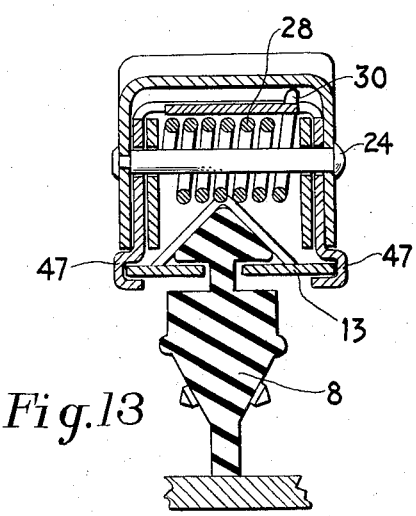
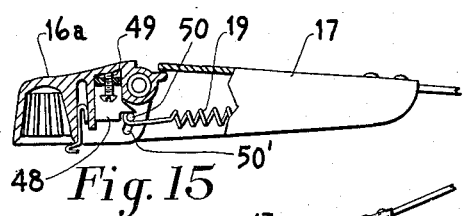
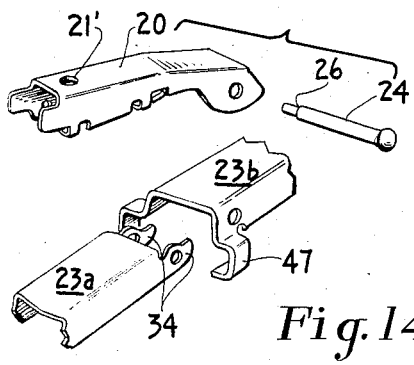
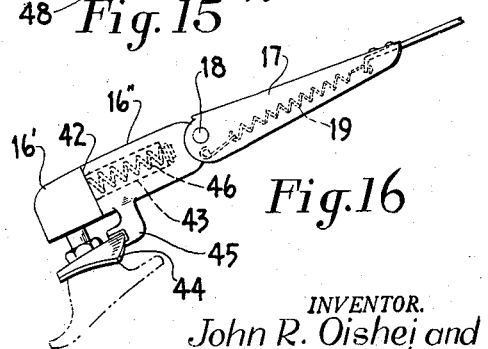
INVENTOR.
John R. Oishei and
Erwin C. Horton
BY
Bean, Brooks, Buckley & Bean
ATTORNEYS

United States Patent Office 2,871,498
Patented Feb. 3, 1959

2,871,498
WINDSHIELD WIPER

John R. Oishei, Buffalo, and Erwin C. Horton, Hamburg, N. Y.; said Horton assignor to Trico Products Corporation, Buffalo, N. Y.

Application January 31, 1955, Serial No. 485,267

11 Claims. (Cl. 15—245)

This invention relates to the windshield wiping art and particularly to the clearing of the wider curved glass windshields more recently developed to provide panoramic vision to drivers of motor vehicles.

The makers of bent glass shapes have succeeded in producing these sharply curved one-piece windshields to provide two panoramic fields of vision, each consisting of frontal and lateral areas or sections merged into one another through a relatively sharper bend in the glass on as little as a fifteen inch radius to form one continuous surface for being wiped in one sweep of an oscillatory wiper.

Heretofore, in all commercially used curved glass blades the arm pressure has been applied through pyramided members having their highest elevation at the center of the assembly. Pressure for the central area or medial portion of the blade has been transferred indirectly thereto from the opposite end portions of the blade through its spring backing, such end portions receiving the arm pressure from the high standing superstructures composed of a primary bridge and one or more secondary levers. The high arched superstructure is provided on top with a bridge-carried arm coupling on which the spring pressure of the wiper activating arm is applied. The distance of this coupling above the glass surface determines the turning couple leverage that reacts through the superstructure to impose a torque upon the wiper actuating arm as it drives the blade sidewise over the windshield. As the blade moves across a partially wet surface its wiping edge will cling tenaciously thereto and impose an abnormal torque load upon the arm sufficient to twist it and cause a spring-back reaction, when the cling is next relieved by a wetter surface, resulting sometime in the blade whipping forwardly clear of the glass. This tendency is more pronounced on the inward stroke of the wiping blade as the latter moves up the lateral section and over onto the frontal section. Further, the point of attachment between the arm and the coupling on the wiper blade rises and falls as the blade wraps around and unwraps from the curved contours and consequently the turning couple varies, thus transmitting variations in degree of this objectionable torque on the actuating arm.

The primary object of this invention is to provide an improved wiping blade having a minimum turning couple between the blade and its actuating arm and a more effective wiping contact for the full length of the blade. The present invention aims further to minimize the wind-lift hazard found in the earlier higher superstructures, and to apply the arm pressure to greater advantage. A new and controlled deeper wrap-around and relief from variable arm twisting cling is obtained, this being accomplished by a low sitting superstructure or carrier designed to give a minimum turning couple reaction that is substantially constant in normal wiping of the windshield.

Further, the invention resides in a multi-lever dual superstructure that introduces a primary and dominating pressure contact along the central area of the flexible backing of the blade between secondary pressure applications on its opposite end portions for achieving a new spreading of more controllable wiper arm pressure along its entire wiping edge. Equally desirable control over the wind-lifting tendency is gained by holding the blade-carrying assembly in a unique manner to obtain a medial point of arm pressure application closer to the glass surface than the longitudinally spaced pivot centers for the end yokes and as close to the longitudinal axis of the blade unit as it safely can be placed to thereby bring the application of the lateral driving force down close to the central area of sliding friction of the blade's wiping edge upon the glass.

From a practical standpoint, the closest point where the arm pressure could be applied is immediately on the back of the wiping element itself, and in the instant invention the construction is such that this can be done for the first time. The end of the arm is in riding contact on the back of the wiping element to insure such constant proximity. This intimate contact reduces the blade-reversing leverage at the start of a wiping stroke and the wiping leverage, the distance from the back of the blade to its wiping edge, is maintained at its absolute minimum throughout its stroke to reduce the torque as well as the amount of backlash between arm and blade. Because the turning couple leverage is always at a very small value, the edge friction when the blade clings is not able to build up any appreciable twist in the arm. The lateral driving contact between the arm and the blade is at all times, in all positions and under all degrees of curvature positioned to ride on the back of the wiper unit.

Full contact of the wiping edge with the glass surface is obtained by independent lever movement from a centered pivot and a combined resilient action involving the properly loaded arm spring as a primary source of pressure and the dual lever spring as a secondary source of pressure to cause the resilient wiper backing and the superstructures for the opposite end portions of the blade to follow closely the surface throughout the blade travel. In this combination of resiliently pivoted parts a newly developed method of pressure distribution along the surface contacting edge of the blade is obtained, this being accomplished through the secondary spring lever hinge means acting on the adjacent inner ends of the dual levers to maintain a substantially constant pressure on the oppositely extending outer ends of the levers to apply arm pressure more effectively to the opposite end portions of the blade, while the principal pressure from the arm spring sustains a dominating pressure directly on the central area of the blade but modified by the secondary spring action on the levers. A variation in pressure distribution may be gained by varying the differential of the two applied pressures.

Preferably, the blade-end superstructures employ nesting members for lateral guidance and for affording a low silhouette, the nesting members being free to move relatively into telescoping relation with each other as they pass over a convex portion of the glass, the arm pressure being partially supported by a reactionary secondary pressure medially of the blade while the lever spring works to wrap the end portion of the blade into wiping contact above the curved contour. The maintenance of the centrally applied arm pressure on the blade insures a predetermined differential distribution of the arm pressure through the secondary spring means. The medial portion of the blade maintains a substantially constant positional relationship with the outer end of the arm as the latter rises and falls when moving back and forth over the front, corner and lateral wind-shield areas. When on a flat surface, the oppositely extending levers will slightly incline downwardly toward the medial portion of the blade to dispose their common point of connection with one another and with the arm down on the back of the blade unit. The movement in the hinge of the arm is used to wipe the glass around the curvature and against the reactionary spring pressure on the outer end of the arm. The center pivot remains in the same position relative to the glass surface at all times, whether the glass is curved or flat.

The gain through shortening the turning couple leverage and overcoming the effect of viscous wet-dry surface cling offers the opportunity for the first time to selectively utilize augmented arm spring tensioning. Here, with primary and secondary spring means employable in balanced relation, more effective distribution of the pressure can be applied over divided wiping zones created by the plural points of contact to better hold the now required longer blades in full wiping relation with the glass.

The building of major thruways and express highways has opened routes which may be traveled at higher car speeds. At such high speeds of travel, the curved windshield contours split the air stream into two currents directed across the windshield side sections. To hold the wipers in wiping contact against the lifting tendency of this air flow, the balanced primary and secondary spring pressures, with the reduced turning couple leverage, will permit the use of amplified tensioning to hold the pressure on the blade at several points and selectively apply more pressure centrally by bringing the arm attachment coupling to bear on the blade in its medial portion.

When the wiper is detached from the arm, the reactionary force of the spring hinge serves to lift the adjacent inner ends of the levers off the back of the blade which relieves the tension somewhat, provision being made to limit this lever-lifting action to preclude injury to the structure. However, when the wiper unit is attached to its actuating arm, the arm spring will overbalance the spring means of the dual super-structures to lower the point of arm pressure application down on the back of the blade for the arm to ride thereon.

Another feature of the present invention resides in an improved backing for the blade, one of nonuniform bending moment, to permit the distribution of the wiping pressure to more easily wrap the blade around the more sharply curved surface. The resiliency in the backing is graduated to flex more readily in its outer end. Requiring less pressure to hold it bent, the strip's reactionary pressure is less productive of a spring back aid to the wind currents lifting the wiper off the surface under wind-lifting urge. The strip is preferably lessened in width to reduce the surface or sail area that is exposed to the wind currents, this being done without sacrificing lateral rigidity. The reduced width will permit somewhat more spiralling flexure than heretofore between its points of contact with the pressure-applying equalizer parts which laterally guide the blade in its travel across the wiping path. In combination with the shorter turning couple the spiral flexing is held down within practical limits, the backing strip sliding freely through the clawshaped end portions of the levers as they move to follow the windshield contour.

The invention further resides in a wiper construction wherein the opposite end portions of the wiping blade are depressed independently of each other under the urge of resilient means which latter, when operative, is conditioned by its actuating arm to firmly hold the blade in wiping contact with the glass, but which permits the application of additional arm pressure to be directed to the medial area of the blade to hold such area down into wiping contact for insuring a clean wipe directly in the driver's more important line of sight.

The foregoing and other objects will manifest themselves as this description progresses, reference being made therein to the accompanying drawing, wherein Fig. 1 is a fragmentary perspective view of a panoramic windshield having the present windshield cleaner installed thereon;

Fig. 2 is a side elevation of the improved wiper having the outer end of an actuating arm connected thereto;

Fig. 3 is a transverse section about on line III—III of Fig. 2 showing more clearly the arm pressure contact with the wiping blade unit;

Fig. 4 is an irregular section taken about on line IV—IV of Fig. 3;

Fig. 5 is a fragmentary exploded perspective view of the wiper arm connection to the spring pressed levers in the wiper superstructure;

Figs. 6 and 7 are diagrammatic views respectively of the new pressure distributing action in the present windshield cleaner and in a former commercial embodiment;

Fig. 8 is a fragmentary view through a modified construction;

Fig. 9 is a fragmentary view of another modification in which the outer pressure equalizer is constructed to differentially apply the spring pressure for more readily effecting the wrap-around action of the blade at its outer end;

Fig. 10 is a fragmentary bottom plan view of a backing strip modified to render its outer end portion more flexible to ease its surface conformance;

Fig. 11 is a like view of another backing strip embodying a greater degree of flexibility in its outer end portion;

Fig. 12 is a side elevation of a modified blade construction having the arm attachment positively located on the back of the blade unit;

Fig. 13 is a cross sectional view on line XIII—XIII of Fig. 12;

Fig. 14 is an exploded view of the modified lever construction of Fig. 12;

Fig. 15 is a fragmentary view of a modified wiper arm embodying a spring tensioning adjustment; and Fig. 16 is a like view of a cam-controlled wiper arm.

Referring more particularly to the accompanying drawings, the numeral 1 designates a curved windshield of the panoramic type having a frontal area 2 and a lateral area 3 joined by a bend or corner area 4, the wiper 5 being oscillated by an arm 6 to trace its path 7 across all three areas. The lateral area 3 forms a side window portion and because it extends substantially longitudinally of the vehicle, the merging or joining bend 4 is relatively sharper and requires the outer end of the blade to flex to a greater degree in order to wrap around the bend and carry its wiping contact over onto the lateral area.

In accordance with the present invention, the wiper 5 comprises a flexible resilient blade body 8 having a wiping lip 9 along one margin and its opposite margin joined by a reduced neck 10 to an anchoring bead 11, such neck being threaded through a slot 12 of a flexible resilient backing strip 13 to place the anchoring bead beneath a longitudinal series of arched cross braces 14. This anchors the blade to its flexible backing and forms a surface conforming wiper unit that is laterally stable. The blade and its backing are held together by end caps 15 which interlock with the metallic backing strip 13.

The wiper arm 6 has a shaft mounted head or inner section 16, an outer wiper-carrying section 17 pivotally connected thereto by a pin 18, and a spring 19 arranged for urging the outer end of the arm toward a windshield surface. The outer end of the arm is equipped with a clip or coupler 20 which may form a permanent part of the arm although it is illustrated as being detachable therefrom and permanently carried by the wiper unit. The coupler may therefore be considered as a part of either the arm or the wiper. The outer end of the arm carries a shoulder 21 designed to interlock with an opening 21' in the coupler under the urge of a spring 21".

The wiper includes the blade unit 8, 13 and its pressure applying and distributing system of levers, said lever system or mechanism comprising a pair of longitudinally spaced equalizers 22 and a pair of levers 23, the two levers extending lengthwise of the unit in end to end relation and having their adjacent inner ends pivotally connected by a member 24. This in effect constitutes two secondary superstructures, each including an equalizer 22 and a lever 23 and both superstructures cooperating to form a primary superstructure. The lever supporting member 24 is depicted in the form of a pivot pin, but it may be larger and have the levers pivoted thereon at spaced points. When a pin is utilized, it may extend through the lever straddling ears 25 of the coupler 20 and constitute a common pivotal connection between the levers and the coupler. The ears 25 are designed to lower the point of arm connection as far as possible to reduce the turning couple and the torque reaction upon the actuating arm 6 to minimize its twisting. In this position, the coupler 20 will bear upon the back of the blade unit. As shown in Figs. 2 and 4, the ears may straddle the flexible backing 13 and bear upon the back of the unit. The pivot pin 24 has a shoulder 26 seating against the inner face of one ear 25 and its adjacent end swaged over the outer face of the ear at 27 to fix the pin to the coupler and leave the levers 23 free to pivot on the pin between the coupler ears.

A coil spring 28 encircles the pivot pin 24 and has its opposite ends 30 bearing respectively upon the two levers 23 which are preferably channel-shaped in cross section to nestingly receive the inner ends of the equalizers 22 to which latter the outer ends of the levers are medially and pivotally connected, as at 31. The spring actually forms a part of the lever supporting member 24 and forms therewith a spring hinge which bears directly upon the back of the wiper unit 8, 13 for support. The opposite ends 30 of the coil spring 28 bear upon the two levers 23 in a reactive manner to urge their outer ends and their supporting pressure equalizers 22 downwardly upon the opposite side margins of the backing strip 13 to which they are slidably connected by the embracing claws 32. A cover plate 33 may be suitably interlocked with one of the levers, to cooperate with the coupler 20 in concealing the coil spring.

The arm spring 19 is of sufficient strength to dominate the upward urge of the coil spring 28 and to depress the arm coupler with its lever supporting member 24 to bear down upon the back of the blade unit 8, 13. In this lowered position, the arm pressure is applied to the blade unit preferably at a point below or on the level with the two equalizer mounting pivots 31. If desired, the member 24 may be anchored permanently on the blade unit in a manner not to interfere with the proper flexing and functioning of the backing 13. Such an arrangement is found in the embodiment of Fig. 12. The advantage of this lowered point of arm connection to the blade unit which brings it as close as possible to the longitudinal axis of the backing strip is to reduce the turning couple and the torque load on the arm. It gives to the turning couple a substantially constant value, with the driving force for the blade being applied sideways close to the glass to overcome the friction in the sliding contact between the wiping lip 9 and the glass.

This turning couple of constant value, in contrast to the variable turning couple in the previously used highly arched superstructure, is graphically depicted in Figs. 7 and 8 which represent the formerly used wiper and the present wiper, respectively. The full line showing of Fig. 7 illustrates the formerly used wiper which embodied the highly arched superstructure composed of a rigid primary yoke A and a pair of rigid secondary yokes B, the latter acting to flex the backing strip D. The spring arm pressure is applied at C and transmitted through the yokes to the flat glass contour. As the wiper passes over a curved surface, the triple yoke structure will fold and thereby lower the arm attaching point to shorten its perpendicular distance above the flexible backing D' and accordingly decrease the turning couple. Should the wiping lip 9 cling abnormally, as when traversing a wet-dry surface, a greater than normal turning couple will impose a heavier torque load on the actuating arm and impair the wiping performance if not scratch the surface. In contrast to this variable torque load condition encountered in the use of the earlier wipers, the present construction maintains a substantially constant torque leverage on the arm during normal windshield cleaning and limits the turning couple at other times to a practical degree. This is illustrated in Fig. 8 wherein the point of arm attachment E is brought down upon the flexible backing D and as near to the glass surface as is practically possible, and this relationship is maintained generally constant throughout the wiper movement. The levers of the secondary superstructures are indicated at F. The dominating spring pressure of the arm restrains a change in this relationship.

When the wiper is removed from its actuating arm, the auxiliary spring 28 will react to lift the inner ends of the levers from the back of the blade unit, and in order to protect the flexible backing from buckling under the idling spring urge, in the absence of the support normally afforded by the windshield, this reactive folding of the levers is limited by one or more stop lugs 34 formed on the adjacent ends of the levers 23.

In the operation of a windshield cleaner embodying the present invention, the wiper carried coupler 20 is telescoped over the outer end of the arm section 17 and interlocked therewith by engaging the lug 21 in the opening 21'. Thereafter, and upon the release of the arm, the spring 19 will urge the wiper against the windshield and hold it there with an urge that dominates the auxiliary spring 28 so that the outer end of the wiper arm and the adjacent ends of the levers 23 are brought low to seat upon the back of the blade unit. This disposition of the arm connection close to the sliding contact of the wiping lip 9 upon the glass surface more readily overcomes the friction threat to facilitate the sideways movement of the blade over the surface. The turning couple developed by such movement is at a minimum with the result that the torque load imposed upon the wiper actuating arm is restricted. The arm pressure is applied medially of the blade and between the inner and outer secondary superstructures 22, 23 and also conditions the auxiliary spring 28 to restore it to full operating strength. This arrangement provides a longitudinal series of five pressure contact points, four of them occurring at the opposite ends of the equalizers and the remaining one located centrally of the blade with a relatively higher pressure.

In the embodiment illustrated in Fig. 2, the pressure applied at the opposite ends of the equalizers is less than that applied medially of the blade. This differential in the pressures may be varied by changing the leverage through a relocation of the arm attachment with respect to the pivotal connection between the levers. In Fig. 8, this is accomplished by displacing the arm attachment pin 24' to the right of the hinge pin 28' and the auxiliary spring 28. By this displacement, the point of arm connection is on one lever, such as the outer lever 23', but close to the spring hinge joint 28' to give a heavier application of pressure and a firmer wiping contact at the outer end portion of the wiper unit relative to the inner end portion thereof.

In Fig. 9 there is disclosed a modified outer equalizer in which is inserted a spring hinge 35 to form independently operable inner and outer lever arms 22' and 22'' which can be so related as to exert a heavier pressure outwardly of the spring hinge 35 for more readily conforming the outer end of the blade unit to the more sharply curved contour of the corner area 4. This construction provides a supplementary spring pressure to cause the outer end of the blade to follow more rapidly the surface contour.

To facilitate this surface conforming flexure at the outer end of the blade, the backing strip 13' is given a lesser degree of resistance to flexing, such as by having its opposite margins notched at 36, Fig. 10, between the bracing cross straps 14 that join the opposite side rails 37. These notches 36 serve to reduce the width of the strip body at such intervals and conditions the outer end portion for easier bending into conformance with the underlying glass contour.

A further modified backing strip 13'' is illustrated in Fig. 11 wherein the notching is performed inwardly of the side margins. The bead retaining fingers 39 which define the slot 12' are formed with dovetail notches 38 in the outer end portion of the backing strip to render it more flexible. The backing strip is provided with a notch 40 designed to interlock with one of the claws 32 for holding the backing in place.

As a means for always supporting the flexible backing in the best position to most effectively accomplish its surface conformance, a changeable support is provided for the backing strip to angularly displace it about a longitudinal axis to maintain it generally parallel to the surface being wiped. Fig. 16 is a fragmentary view of a cam-controlled arm capable of so rocking the wiper. This arm has a fixed mounting head 16' and an outer wiper carrying section 17 under the urge of a spring 19. The shaft-mounted head 16' is divided at 42 to provide an intermediate follower-carrying section 16'' on which the outer section 17 is hinged by a pin 18. The section 16'' is rockable about a tubular shaft 43 that extends longitudinally from the mounting section 16'. This will permit the arm carrying section 17 to oscillate upon the longitudinal axis of the arm for maintaining the wiper substantially normal to the surface being wiped. Underlying the mounting head 16' is fixed a cam plate 44 with which a follower 45 cooperates to rotate the blade-carrying portion of the arm in accordance with the cam pattern. The follower 45 may be disengaged from the cam by retracting the outer portion 16'', 17 of the arm along the shaft 43 and against the urge of a spring 46. This cam-controlled arm will serve to hold the backing strip in a position in which its underface is normally substantially parallel to the surface so that the flexing of the backing will primarily be in a direction normal to the surface, subject to possible spiral twisting flexure of the strip.

If desired, the point of connection between the arm and the blade unit may be made permanent, as by pivotally connecting the coupler ears to the blade unit, as to the side margins of the backing strip. Specifically one lever 23b is formed with claws 47 for straddling and slidably grasping the opposite side margins of the backing strip, as shown in Figs. 12, 13 and 14. This arrangement will hold the levers 23a and 23b permanently depressed to fix the turning couple leverage. These claws 47 may be formed on the side flanges of lever 23b, sufficient clearance being provided in the claws to permit proper surface conforming flexing of the backing strip.

From the foregoing it will be appreciated that the dominating arm spring bears a definite relation to the coil spring 28 in order to provide the desired firm contact medially on the blade unit and a lighter contact toward the ends of the blade where the torque is more pronounced. The pressures transmitted by the levers 23 of the secondary superstructures will be further divided by the equalizers to provide the prescribed wiping pressures for the opposite end portions of the blade. The arm pressure applied medially of the blade may be regulated, if desired, by an arm spring tensioning arrangement such as that depicted in Fig. 15 wherein the spring 19 has one end anchored on a pin 50 that is slidably adjustable in the angularly disposed slot 50' to vary its tension. An adjusting slide 48, providing a support for the anchor pin, is slidable within a recess in the head 16a for this purpose, the screw 49 serving to effect adjustment of the slide.

The present invention provides a practical windshield cleaner for curved surfaces having a minimum turning couple that reduces the torque load upon the actuating arm. The wiper has a low silhouette with no high-standing bridge exposed to wind currents. The wiper embodies a lever superstructure or carrier for each end portion of the blade each operable independently of the other and having a point of arm attachment disposed closer to the wiping edge than are the pivotal connections in the superstructure. The outer end of the arm bears directly upon the central area of the blade unit, the pivot pin 24 together with the encircling coil spring 28 and the straddling ears 25 providing a connection unit at the outer end of the arm for straddling the back of the blade unit to interlock the two units to afford lateral support for the blade. The connection units 24, 25, 28 provide supports for the inner and outer blade-end pressure transmitting structures to permit independent movement of each structure for surface conforming action.

Fig. 9 illustrates by broken lines the surface conforming action of a blade unit embodying a modified backing strip having its outer end portion made more flexible and less resistant to flexing, the outer tip portion of the blade showing a surface conformance over a radius relative to the adjacent inner portion which is conformed to a surface having a greater radius.

By reason of the primary pressure being applied directly to the central area of the blade unit the wiping contact of such medial portion of the blade with the glass is maintained. Minus the bridge, the blade center is spring pressed by pressure applied directly from the arm, providing a fifth pressure contact for fully hugging the glass. This gives positive pressure selectively where it is needed on the vision level of the line of sight through the center of the range of wipe. The structure here reverses the earlier curved glass wiper concept. In the instant invention, to maintain the perfect wipe, sub-divided secondary pressure is now transferred outwardly from the center instead of inwardly from the blade ends.

The inner blade-end pressure transmitting structure comprising the inner equalizer 22 and inner lever 23, in the several embodiments illustrated, may have their nesting side channel walls extended downwardly to substantially the level of the claw at the inner end of such equalizer when the blade is resting on a flat surface, thereby to substantially enclose the anchoring bead 11 of the blade 8 and the cross arches 14 against snow drifting into the inverted channels for packing and hindering the relative movement between the two members. The inner end of the wiper moves over a relatively flat glass surface and there is little relative movement between the equalizer and the connected lever so that the flexing of the backing strip upwardly will not hinder the distribution of the arm pressure to the inner end portion of the blade unit. The term "equalizer" has herein been used in a broad sense to include a yoke or whippletree member whether pivoted exactly in the center or toward one end.

The foregoing description has been given in detail without thought of limitation since the inventive principles involved are capable of assuming other physical embodiments without departing from the spirit of the invention and the scope of the appended claims.

What is claimed is:

1. A windshield wiper for curved windshields, comprising a flexible blade having an elongate flexible backing strip of greater width than thickness for surface conformance, a superimposed pair of levers connected end to end by a spring hinge and having the latter resiliently imposing a downward urge through the outer ends upon the blade at its opposite end portions, the hinge and its connected inner end portions of the levers providing a medial portion, arm coupling means mounted on the medial portion for transmitting an arm-applied spring urge thereto dominating the reactive urge of the spring hinge for holding the medial portion of the blade in wiping contact during operation, and a pressure transmitting claw member slidably connected to the backing strip and serving to tie the medial portion thereto against lifting said medial portion from the backing strip under the reactionary urge of the spring hinge.

2. A windshield wiper according to claim 7, in combination with a wiper actuating arm for imposing such dominating spring urge through the arm coupling means.

3. A windshield wiper according to claim 8, wherein said arm coupler has transversely spaced ears in straddling relation to the spring hinge.

4. A windshield wiper according to claim 7, wherein said positive connection includes laterally spaced claw means grasping and having pressure transmitting contact with the side margins of the medial portion of said flexible backing to exert arm pressure thereon independently of said spring hinge.

5. A windshield wiper according to claim 7, wherein a pressure equalizing yoke is pivotally mounted on an outer end of one lever and operatively connected to the flexible backing.

6. A windshield wiper for curved windshields, comprising a flexible blade having an elongated flexible backing, a superimposed pair of levers connected end to end by a spring hinge to resiliently depress the outer ends of the levers upon the blade and being adapted for mounting on a spring loaded arm having a spring urge dominating the reactive urge of the spring hinge, and an arm coupler connected to the spring hinge and together therewith and with the inner ends of the levers providing a support having a direct pressure transmitting contact with the medial portion of the flexible backing for positively exerting such dominating spring urge through a minimum turning couple with the arm coupler.

7. A windshield wiper for curved windshields, comprising a flexible blade having an elongated flexible backing, a superimposed pair of levers connected end to end by a spring hinge to depress the outer ends of the levers upon the blade and being adapted for mounting on a spring loaded arm having a spring urge dominating the reactive urge of the spring hinge, and a positive connection between the spring hinge and the backing.

8. A windshield wiper for curved windshields, comprising a flexible blade having an elongated flexible backing, a superimposed pair of levers connected end to end by a spring hinge to depress the outer ends of the levers upon the blade and being adapted for mounting on a spring loaded arm having a spring urge dominating the reactive urge of the spring hinge, a positive connection between the spring hinge and the backing, and an arm coupler connected to the spring hinge for transmitting the spring urge of an attached arm through the positive connection to the backing.

9. A wiper for curved windshields, comprising a blade unit having surface-conforming flexure and lateral stability, blade-end pressure applying means on the back of the blade unit embodying a lever for each end portion thereof connected thereto and extending inwardly lengthwise of the unit, said levers being arranged end to end, a spring hinge joining the adjacent inner ends of the levers for hinging movement about a transverse common axis and exerting a yieldable urge through the pressure applying means upon the respective end portions of the unit, and an arm coupler on the back of the pressure applying means positively connecting the blade unit to the spring hinge and acting upon the central area of the unit to fix the turning couple thereat.

10. A windshield wiper according to claim 6, wherein said arm coupler is connected to the spring hinge off-center with respect to the hinge axis.

11. A windshield wiper according to claim 1, wherein the outer end portion of the flexible backing strip embodies a relatively lesser degree of resistance to flexing for easier bending into conformance with the surface being wiped.

References Cited in the file of this patent

FOREIGN PATENTS

| | | |
|---|---|---|
| 1,033,521 | France | Apr. 1, 1942 |
| 1,048,036 | France | July 29, 1953 |

UNITED STATES PATENT OFFICE
CERTIFICATE OF CORRECTION

Patent No. 2,871,498 February 3, 1959

John R. Oishei et al.

It is hereby certified that error appears in the above numbered patent requiring correction and that the said Letters Patent should read as corrected below.

In the grant, lines 2 and 3, for "said Horton assignor to Trico Products Corporation, of Buffalo, New York," read -- assignors to Trico Products Corporation, of Buffalo, New York, --; lines 12 and 13, for "John R. Oishei, his heirs or assigns, and Trico Products Corporation, its successors" read -- Trico Products Corporation, its successors --; in the heading to the printed specification, lines 4 and 5, for "said Horton assignor to Trico Products Corporation, Buffalo, N. Y." read -- assignors to Trico Products Corporation, Buffalo, N. Y.

Signed and sealed this 16th day of June 1959.

(SEAL)
Attest:
KARL H. AXLINE
Attesting Officer

ROBERT C. WATSON
Commissioner of Patents